Figure 1:
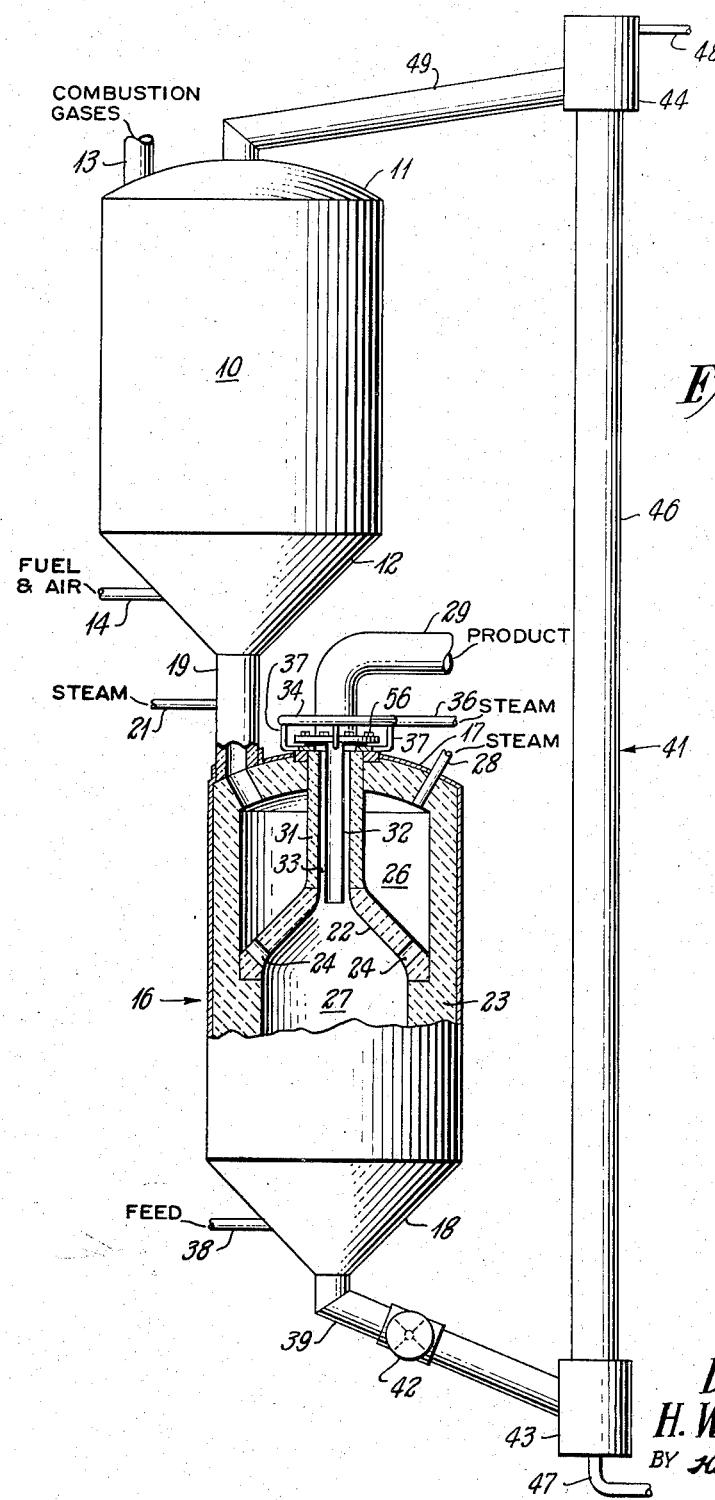

INVENTORS
D. S. Hall and
H. W. Hennigan
BY Hudson and Young
ATTORNEYS

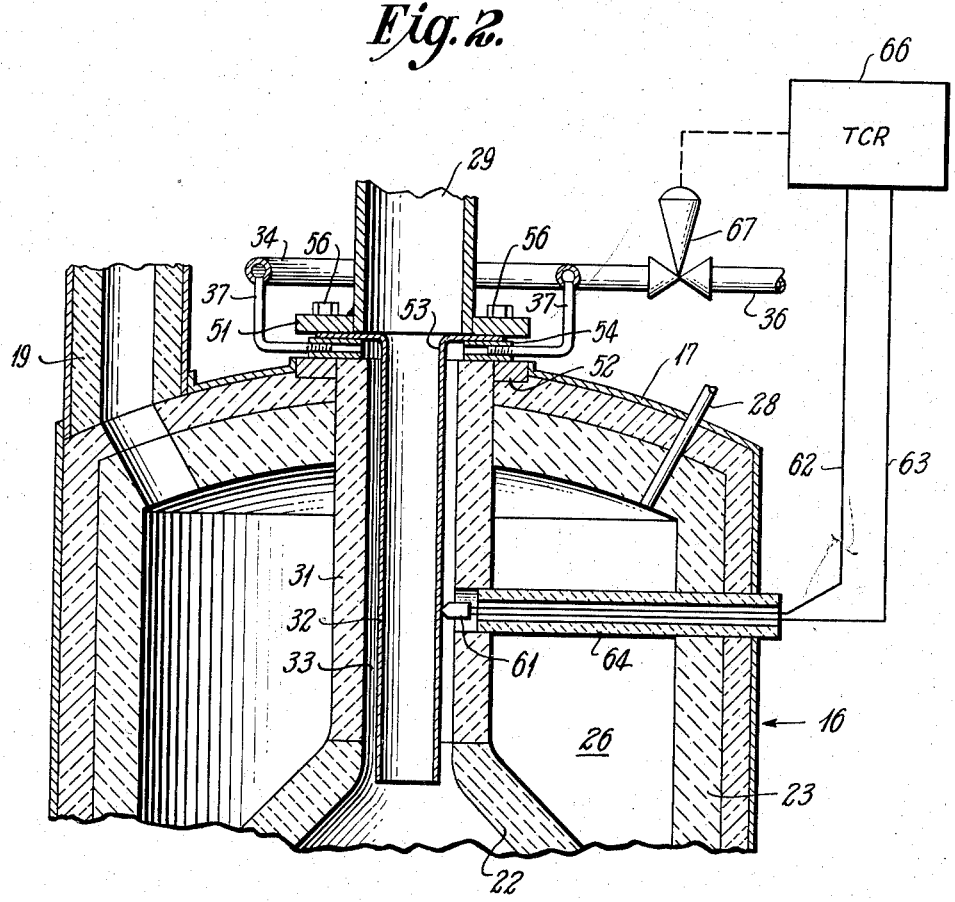

United States Patent Office 2,875,146
Patented Feb. 24, 1959

2,875,146

PREVENTION OF COKE DEPOSITIONS IN A HYDROCARBON COKING ZONE

Dick S. Hall and Henry W. Hennigan, Phillips, Tex., assignors to Phillips Petroleum Company, a corporation of Delaware Application April 15, 1954, Serial No. 423,426

12 Claims. (Cl. 208—48)

This invention relates to the conversion of hydrocarbons. In one of its more specific aspects, it relates to pebble heater apparatus. In another of its more specific aspects, it relates to means for preventing the deposition of carbonaceous materials within the gaseous effluent outlet conduit from the reactor of pebble heater apparatus. In still another of its more specific aspects, it relates to a method for inhibiting carbon laydown on the inner surface of the gaseous effluent outlet conduit from the reactor of pebble heater apparatus. In another of its more specific aspects, it relates to a method for removing carbon deposits from the inner surface of the gaseous effluent outlet conduit from the reactor of pebble heater apparatus.

Apparatus used in carrying out thermal conversion processes wherein a flowing mass of solid heat exchange material, heated to a high temperature by passing hot combustion gases therethrough in a first direct heat exchange relation, is thereafter caused to contact gaseous reactant materials in a second direct heat exchange relation is generally called pebble heater apparatus. Pebble heater apparatus may be advantageously employed in various processes such as hydrocarbon conversion, gas absorption, and gas-solid heat exchange in general. A principal use of pebble heater apparatus is in the conversion of hydrocarbons, involving thermal or catalytic processes such as cracking, hydrogenation, dehydrogenation, isomerization, polymerization, oxidation, and the like.

Solid heat exchange material which is conventionally used in pebble heater apparatus is generally called "pebbles." For a more detailed description of the pebbles which can be utilized herein, reference may be had to U. S. Patent No. 2,536,436.

Conventional pebble heater apparatus usually comprises a series of at least two chambers positioned substantially in vertical alignment with one another. The upper and lower chambers are sometimes referred to, respectively, as the pebble heating chamber and the gas reaction chamber. The pebbles are introduced into the upper portion of the pebble heating chamber where they form a moving bed of solid heat exchange material which flows downwardly through the chamber in direct heat exchange with hot gaseous heat exchange material. The hot gas in contacting the pebble mass transfers heat thereto, the effluent gas being removed thereafter from the upper portion of the heating chamber. Hot pebbles are then passed downwardly from the heating chamber through a pebble throat into the gas reaction chamber where they are contacted in countercurrent flow with gaseous reactant material in a second direct heat exchange relation. Effluent gas from the gas reaction chamber is withdrawn from the top portion thereof while relatively cool pebbles gravitate from the lower portion of that chamber and are subsequently recycled to the top portion of the pebble heating chamber.

In the operation of pebble heater apparatus, one of the outstanding difficulties encountered arises from the fact that carbonaceous materials are deposited in the upper portion of the gas reaction chamber and around the gaseous effluent outlet conduit from that chamber. A method for eliminating or substantially minimizing such a lay-down of carbon has been recently proposed by Myron O. Kilpatrick in copending U. S. application, Serial No. 185,437, filed September 18, 1950, now U. S. Patent 2,680,706, issued June 8, 1954, whereby steam is introduced into the reaction chamber in such a manner that a blanket of steam is formed in the upper portion of the chamber. By so blanketing the upper portion of the reaction chamber, products resulting from the conversion of hydrocarbons are prevented from contacting the surface of the upper portion of the chamber. When operating in this manner, the reaction products are removed from the reactor before they have time to contact the upper portion of the chamber which would cause lay-down of carbon by further conversion thereof. It has been found, however, that carbonaceous materials also have a tendency to deposit within the gaseous effluent outlet conduit from the reaction chamber. This tendency is especially pronounced in reactors in which a portion of the effluent outlet conduit is positioned within the reaction chamber, the carbon deposit occurring primarily in that portion of the conduit. The formation of carbon in the effluent outlet conduit has a very deleterious effect upon the efficiency of operation of the pebble heater apparatus, resulting in an excessive pressure drop through the reaction chamber. As a result of the increased pressure drop through the reactor, pebbles may be carried out of the reactor through the effluent outlet conduit. As the carbon deposit builds up in the effluent outlet conduit, flow of conversion products from the reactor is substantially retarded and may even be terminated. Because of the decreased rate of flow of reaction products from the reaction chamber, the reactant materials are held in that chamber for a longer residence time, causing a deeper cracking reaction than desired and concomitantly an accelerated lay-down of carbon within the reaction chamber. In conventional pebble heater apparatus, when carbon has accumulated within the reaction chamber as described above, a complete shutdown of the pebble heater apparatus becomes necessary in order to remove the carbon deposits. In accordance with the present invention, means are provided whereby the formation of carbon within the effluent outlet conduit is substantially eliminated.

The following objects of the invention will be attained by the various aspects of the invention.

It is an object of the present invention to provide an improved process for the conversion of hydrocarbons.

Another object of the invention is to provide an improved pebble heater reactor.

Still another object of the invention is to provide means for controlling the temperature of the inner surface of the gaseous effluent outlet conduit of a pebble heater reactor so as to prevent deposition of carbonaceous materials therein.

A further object of the invention is to provide a method for controlling the temperature of the inner surface of the gaseous effluent outlet conduit of a pebble heater reactor so as to prevent overcracking of the effluent gas on coming in contact therewith.

A still further object of the invention is to provide a method for removing carbon deposits which may form on the inner surface of the gaseous effluent outlet conduit of a pebble heater reactor.

Other and further objects and advantages will become apparent to those skilled in the art with reference to the following disclosure.

Broadly speaking, the present invention is directed to a method and means for inhibiting the deposition of carbonaceous materials on the inner surface of the gaseous effluent outlet conduit of a pebble heater reactor. The carbon deposition is believed to be the result of overcracking of the hydrocarbons on coming in contact with the inner surface of the portion of the effluent outlet conduit disposed within the reactor. It has been found that this laydown of carbon may be inhibited or substantially eliminated by controlling the temperature of the inner surface of the outlet conduit so as to avoid overcracking of the effluent gas. In accordance with this invention, a tube is positioned within that portion of the outlet conduit which is disposed within the reactor so as to form an annular space therebetween. An inert gas, such as steam, is introduced into the annular space, thereby controlling the temperature of the tube so that it will not become so hot that the effluent gas will be overcracked on coming in contact therewith. It is also desirable that the inner surface of the tube does not become so cold relative to the temperature of the effluent gas that condensation of gas-carried tar and oil takes place on the inner surface of the tube. Accordingly, flow of the inert gas is further controlled so as to avoid a surface which is too cool as well as too hot. In accordance with a preferred modification of the invention, a method for removing carbon from the outlet conduit is provided whereby wet steam is introduced into the annular space, causing sudden contraction of an inner stainless steel tube. Any carbon deposit is thereby cracked and broken up, and passes out of the tube along with the effluent gas. In accordance with another preferred modification of the invention, means are provided for automatically controlling the rate of supply of steam to the annular space so as to maintain the liner at a desired temperature.

A more complete understanding of the invention may be obtained by referring to the following description and the drawing, in which:

Figure 1 is an elevation, partly in section, of pebble heater apparatus utilizing the present invention; and Figure 2 is an elevation, partly in section, of the upper portion of a pebble heater reactor illustrating the present invention.

Referring to the drawing and in particular to Figure 1, pebble heater apparatus is illustrated which comprises an upright elongated shell 10 closed at its upper and lower ends by closure members 11 and 12, respectively. Gaseous effluent outlet conduit 13 extends from the upper portion of the pebble heating chamber formed within shell 10 while heating material inlet conduit 14 is provided in the lower portion of that chamber. Upright elongated shell 16, closed at its upper and lower end by closure members 17 and 18, respectively, is disposed below shell 10. Pebble conduit means such as conduit 19, or a plurality of such conduits, extends between closure member 12 of shell 10 and closure member 17 of shell 16. Line 21 connected to conduit 19 provides means for introducing an inert gas, such as steam, into that conduit.

A substantially conical baffle member 22, in the form of a load supporting dome and positioned intermediate the ends of shell 16, is supported at its periphery by insulation material 23 lining the walls of the shell. A plurality of pebble conduit means 24 disposed around the lower periphery of conical baffle member 22 communicate pebble soaking chamber 26, formed above conical baffle member 22, with reaction chamber 27, formed below conical baffle member 22. Gaseous inlet means 28, which communicates with pebble soaking chamber 26, provides means for introducing an inert gas into the pebble soaking chamber. Gaseous effluent outlet conduit 29 extends upwardly from the apex of conical baffle member 22 to the exterior of shell 16. That portion 31 of gaseous effluent outlet conduit 29 disposed within shell 16 has a tube 32 positioned therein so as to form an annular space 33, the lower end of which is open to reaction chamber 27. It is preferred to utilize a stainless steel tube but the tube may be constructed of other suitable metals or of refractory material without departing from the scope of the invention. A header member 34 having an inlet line 36 connected thereto is positioned above shell 16. A plurality of outlet lines 37 lead from header member 34 to annular space 33 as will be described more in detail in conjunction with Figure 2. It is to be understood that other suitable arrangements of apparatus for supplying an inert gas to annular space 33 may be provided which come within the contemplation of the invention.

A reactant material inlet conduit 38 is provided in the lower portion of shell 16. Pebble outlet conduit 39, which extends downwardly from closure member 18 of shell 16 is connected to the lower portion of elevator 41. Pebble feeder 42 is located intermediate the ends of pebble outlet conduit 39 and may be one of the conventional pebble feeders such as a star valve, a gate valve, a rotatable table feeder, or the like. As illustrated, elevator 41 is of the gas lift type comprising a lower pebble engaging chamber 43 and an upper pebble disengaging chamber 44 connected by an upright gas lift conduit 46. Lift gas inlet line 47 is affixed to the lower end of engaging chamber 43 while effluent outlet 48 is connected to the upper portion of disengaging chamber 44. Pebble inlet conduit 49 extends between disengaging chamber 44 and closure member 11 of shell 10.

Referring to Figure 2 of the drawing, the upper portion of the reactor of Figure 1 is shown in detail. Identical numerals have been employed to designate elements corresponding to those described in conjunction with Figure 1. A flange 51 is affixed to that end of gaseous effluent outlet conduit 29 which is disposed outside of and adjacent shell 16 while a second flange 52 is connected to the opening in shell 16 through which outlet conduit 29 extends. Tube 32 has a collar member 53 attached to its upper end, the collar being supported between flange 51 and an annular member 54 which is in turn supported by flange 52 and outlet conduit portion 31. A plurality of bolts 56 extending through flange 51 are threaded into flange 52 so as to maintain tube 32 securely in position and assure a gas tight seal between flanges 51 and 52, collar 53 and annular member 54. Annular member 54 has a plurality of openings therein to which lines 37 are connected so as to furnish means for introducing an inert gas into annular space 33. Any tendency for the lower end of tube 32 to move may be overcome by providing suitable support members or by flaring portions of that end of the tube so as to contact baffle member 22.

In the operation of the apparatus of Figures 1 and 2, pebbles are introduced into the upper portion of the heating chamber formed within shell 10 and are gravitated therethrough as a contiguous mass of pebbles. A heating material is passed into the lower portion of the heating chamber through inlet conduit 14. The heating material may be fuel and air, the fuel being burned upon the surface of the pebbles within the heating chamber, or below or around the pebble bed. The heating material may also be a hot combustion gas resulting from the combustion of a fuel outside the heating chamber. The hot combustion gases which are passed upwardly through the gravitating mass of pebbles within the heating chamber are removed from the chamber through gaseous effluent outlet conduit 13. The gravitating pebbles are heated by direct heat exchange with the hot combustion gases to temperatures generally in the approximate range of 1200° F. to 3200° F., depending upon the particular reaction being carried out within the pebble heater reaction chamber. The hot pebbles are gravitated through conduit 19 into pebble soaking chamber 26 formed within the upper portion of shell 16. An inert sealing gas, such as steam, is passed into conduit 19 through line 21 thereby preventing downward flow of combustion gases from the heating chamber and upward flow of gases from the pebble soaking chamber. The temperature of the pebbles entering pebble soaking chamber 26 is generally about 100° F. to about 500° F. below the average temperature of the combustion gases within the heating chamber.

The pebbles reside momentarily within the pebble soaking chamber 26 and thereafter pass through pebble conduit means 24 as a plurality of streams of pebbles into reaction chamber 27. An inert gas, such as steam, which is introduced into the pebble soaking chamber through inlet line 28, contacts the pebbles within the pebble soaking chamber and tends to equalize any temperature differential which may exist between the pebbles therein. Gaseous reactant materials introduced into reaction chamber 27 through inlet conduit 38 contact the gravitating mass of pebbles therein and undergo reaction. The product-containing gas is withdrawn through gaseous effluent outlet conduit 29 and thereafter passed to quenching means and a purification system, not shown. The cooled pebbles flow from the bottom of the reaction chamber through pebble outlet conduit 39 and thereafter pass into engaging chamber 43 at a rate dependent upon the operation of pebble feeder 42. In the engaging chamber, the pebbles contact a stream of lift gas, such as air, which is introduced into the lower end thereof through lift gas inlet line 47. Pebbles are raised by the air stream through gas lift conduit 46 to the top of the elevator where they fall out of the air stream in disengaging chamber 44. The pebbles flow downwardly from disengaging chamber 44 through pebble inlet conduit 49 into the upper portion of the pebble heating chamber. The air is withdrawn from disengaging chamber 44 through gaseous effluent outlet 48.

During the operation of the pebble heater apparatus as described above, carbonaceous materials may tend to deposit on the lower side of conical baffle member 22 and around the inlet to gaseous effluent outlet conduit 29. The inert gas introduced into pebble soaking chamber 26 through inlet line 28 flows from the pebble soaking chamber through pebble conduit means 24 and the reaction chamber 27 so as to sweep the underside of conical baffle member 22. It is preferred to utilize steam as the inert gas but other gases may be employed, such as nitrogen, ethane, methane or any light inert or highly refractory gas which does not react at the high temperatures encountered in the reaction chamber. By continuously maintaining a supply of steam to the pebble soaking chamber, a moving film of steam may be maintained along the lower surface of conical baffle member 22, thereby preventing contact between the surface of the baffle member and the reaction products. In this manner, formation of carbon on the lower surface of the baffle member is substantially eliminated. Prevention of carbon deposition on the inner surface of a load-supporting dome such as baffle member 22 is more fully disclosed by one of us in copending U. S. application, Serial No. 400,461, filed December 28, 1953.

It has been found, however, that when steam is introduced into the reaction chamber in the above described manner, carbon may still deposit on the inner surface of the gaseous effluent outlet conduit leading from the reaction chamber. This condition is believed to be attributable to the fact that the steam in passing out of the reaction chamber is mixed with the reaction products and is, therefore, incapable of forming a protective blanket along the inner surface of that portion of the outlet conduit disposed within the pebble soaking chamber. The gaseous effluent outlet conduit in extending through the pebble soaking chamber to the exterior of the shell comes in contact with hot pebbles which maintain that portion of the conduit at such a high temperature that overcracking of the reaction products will result unless some provision is made for preventing such overcracking. In accordance with the present invention, an inert gas, similar to that introduced into the pebble soaking chamber through inlet line 28, is passed from header member 34 into annular space 33 through lines 37. The steam fills the annular space passing downwardly therethrough into reaction chamber 27 from which it is removed with the effluent gas. The amount of steam supplied to annular space 33 is controlled so as to maintain the inner surface temperature of tube 32 at approximately that of the effluent gas. By so controlling the temperature of tube 32, overcracking of the effluent gas when it comes in contact with the inner surface of the tube is prevented. Furthermore, by maintaining the temperature of tube 33 at approximately that of the effluent gas, tar and oil carried by the reaction products are prevented from condensing on the inner surface of the tube, which may result if the tube is allowed to become too cool. Accordingly, by controlling the flow of steam to the annular space it is possible to avoid a surface which may be either too hot or too cool.

In some cases it may happen that carbonaceous materials will build up within the gaseous effluent outlet conduit even though an inert gas is supplied to annular space 33 as described above. While it is desirable to maintain pebble heater operating conditions as uniform as possible it has been found that variations therein will result from a variety of causes, e. g., inadvertent changes in hydrocarbon feed rate, in pebble flow rate, in pebble temperature, or in the supply of inert gas to annular space 33. When utilizing a stainless steel tube, such variations in operating conditions will cause tube 33 to alternately expand and contract. This expansion and contraction of the tube results in the cracking and breaking up of any deposited carbon which is then carried out of the tube along with the effluent gas. It may be undesirable, however, to rely upon the occurrence of non-uniform operating conditions in order to effect expansion and contraction of tube 33 so as to remove carbon deposited therein. Accordingly, in accordance with a preferred modification of the invention, flow of inert gas to annular space 33 is intermittently varied so as to cause alternate expansion and contraction of stainless steel tube 33. Any carbon deposited in the tube is thereby broken up and dislodged from the inner surface of the tube and subsequently passes out of the tube along with the effluent gas.

In accordance with another preferred modification of the invention as illustrated in Figure 2, means are provided for automatically and continuously controlling the amount of steam supplied to annular space 33. A thermocouple 61 is utilized to continuously measure the temperature of liner 32. Because of the high temperatures involved, it is preferred to use a noble metal thermocouple, e. g., one having one wire of platinum and one of platinum—10 percent rhodium. The hot junction of the thermocouple is maintained in contact with liner 32 as by welding when using a stainless steel liner and is shielded in a manner well known in the art. The thermocouple is preferably positioned in contact with the lower portion of liner 32, for this portion of the liner is at a somewhat higher temperature than the upper portion. Extension leads 62 and 63, enclosed in refractory conduit 64 and made of a metal, such as platinum, capable of withstanding the temperatures within soaking chamber 26, are connected to temperature controller-recorder 66. Controller 66 is operatively connected to valve 67 in steam line 36.

The signal produced by thermocouple 61, which is proportional to the temperature of liner 32, is fed through leads 62 and 63 to controller 66. The controller, which is given the temperature setting at which it is desired to maintain the liner, thereafter continuously regulates valve 67 so that steam is supplied to annular space 33 at the rate necessary to maintain the liner at the desired temperature. In general, it is preferred to control the flow of steam so that the temperature of the liner is no higher than that of the effluent gas, but not more than 200° F. below the temperature of that gas.

A more comprehensive understanding of the invention may be obtained by reference to the following example which is not intended to be unduly limitative of the invention.

A gaseous hydrocarbon feed containing about 60 mol percent ethane and 6.6 mol percent propane was supplied at the rate of about 40,000 S. C. F. H. to the reactor of a pebble heater system similar to that illustrated in the drawing. Pebbles were circulated through the system at the rate of 36,300 lbs./hr. The pebbles entered the reactor at a temperature of about 1850° F. The hydrocarbon feed contacted the hot pebbles in countercurrent flow and was cracked with an ethane conversion of 86.3 percent and a propane conversion of 94.0%. The pebbles left the reactor at a temperature of about 955° F. The temperature of the effluent gas removed from the reactor through the effluent outlet conduit was about 1565° F. Steam was supplied to the soaking chamber at the rate of about 1200 lbs./hr. and to the annular space between the effluent outlet conduit and its stainless liner at the rate of about 400 lbs./hr. The temperature of the bottom portion of the liner was about 1500° F. while the temperature of the top portion of the liner was about 1400° F.

After a period of 22 days during which time the pebble heater system continuously operated under conditions similar to those set forth in the example above, the stainless steel liner was examined and found to be free of carbon deposition. In prior operations in which a liner was not employed, carbon deposited on the effluent outlet tube at a rapid rate, causing an excessive pressure drop through the reactor in from 2 to 4 days depending upon the relative temperature of the effluent gas and the pebbles.

It will be apparent that in accordance with the present invention an efficient means is provided for inhibiting the deposition of carbonaceous materials on the inner surface of a gaseous effluent outlet conduit from a pebble heater reactor. Furthermore, it is evident that we have provided a method for removing carbon which may tend to deposit on the inner surface on the gaseous effluent outlet conduit. By operating in the described manner, it is unnecessary to take the pebble heater apparatus off stream in order to remove carbon from the outlet conduit, thereby effecting a considerable saving in the cost of operation. While the present invention has been described and illustrated with relation to a particular pebble heater reactor, it is to be understood that the invention may be applied to other types of reactors. For example, in view of the above disclosure, it becomes evident that the invention may be utilized with reactors employing a plurality of gaseous effluent outlet conduits which extend from the interior of the reaction chamber to the exterior of the reactor.

As will be evident to those skilled in the art, various modifications of this invention may be made or followed in the light of the foregoing disclosure and description without departing from the spirit or scope of the disclosure.

We claim:

1. An improved reactor for pebble heater apparatus which comprises, in combination, a closed upright elongated shell; pebble inlet means in the upper end of said shell; pebble outlet means in the lower portion of said shell; fluid inlet means in the lower portion of said shell; an effluent outlet conduit extending from the interior of the upper portion of said shell to the exterior of said shell; a tube disposed within and substantially co-extensive with that portion of said effluent outlet conduit within said shell and spaced apart from said effluent outlet conduit so as to form an annular space therebetween, said annular space being in open communication with the interior of said shell; and means for introducing an inert gas into said annular space.

2. The reactor of claim 1 wherein said tube is made of stainless steel.

3. The reactor of claim 1 wherein said tube is made of refractory material.

4. The reactor of claim 1 wherein a thermocouple is positioned adjacent said tube, a controller is operatively connected to a flow control means contained in said means for introducing an inert gas into said annular space, and means are provided for connecting said thermocouple to said controller.

5. An improved reactor for pebble heater apparatus which comprises, in combination, a closed upright elongated shell; pebble inlet means in the upper end of said shell; pebble outlet means in the lower portion of said shell; fluid inlet means in the lower portion of said shell; a substantially conical baffle member disposed in said shell intermediate its ends, said member being supported at its periphery by the walls of said shell; a plurality of pebble conduit means spaced around the periphery of said conical baffle member and communicating a pebble soaking chamber formed within said shell above said baffle member with a reaction chamber formed within said shell below said baffle member; an effluent outlet conduit extending from the apex of said conical baffle member through said pebble soaking chamber to the exterior of said shell; a tube disposed within and substantially co-extensive with that portion of said effluent outlet conduit within said shell and spaced apart from said effluent outlet conduit so as to form an annular space therebetween, said annular space being open to said reaction chamber; and means for introducing an inert gas into said annular space.

6. The reactor of claim 5 in which means is provided for introducing an inert gas into said pebble soaking chamber.

7. The reactor of claim 5 wherein said tube is made of stainless steel.

8. The reactor of claim 5 wherein said tube is made of refractory material.

9. The reactor of claim 5 wherein a thermocouple is positioned adjacent said tube, a controller is operatively connected to a flow control means contained in said means for introducing an inert gas into said annular space, and means are provided for connecting said thermocouple to said controller.

10. An improved reactor for pebble heater apparatus which comprises, in combination, a closed upright elongated shell; pebble inlet means in the upper end of said shell; pebble outlet means in the lower portion of said shell; fluid inlet means in the lower portion of said shell; a substantially conical baffle member disposed in said shell intermediate its ends, said member being supported at its periphery by the walls of said shells; a plurality of pebble conduit means spaced around the periphery of said conical baffle member and communicating a pebble soaking chamber formed within said shell above said baffle member with a reaction chamber formed within said shell below said baffle member; an effluent outlet conduit extending from the apex of said conical baffle member through said pebble soaking chamber to the exterior of said shell; a tube positioned within and substantially co-extensive with that portion of said effluent outlet conduit disposed within said shell and spaced apart therefrom so as to form an annular space therebetween, said annular space being closed at its upper end and open at its lower end to said reaction chamber; a header member positioned above said shell, said member having inlet conduit means connected thereto; conduit means connecting said header member to the upper end of said annular space; and gas inlet means in communication with said soaking chamber.

11. A process for the conversion of hydrocarbons which comprises heating pebbles in a heating zone to a temperature within the range of between 1200° F. and 3200° F.; gravitating said heated pebbles into and through a reaction zone; countercurrently contacting said heated pebbles in said reaction zone with hydrocarbon reactant materials in direct heat exchange; raising said hydrocarbon reactant materials to conversion temperature by said direct heat exchange; removing the resulting reaction products from within the upper portion of said reaction zone by passing same through a product withdrawal zone; maintaining said product withdrawal zone at about the temperature of said reaction products by passing an inert gas into an annular heat exchange zone encompassing said product withdrawal zone and substantially coextensive therewith; removing said pebbles from the lower portion of said reaction zone; and returning said pebbles to said heating zone.

12. A process for the conversion of hydrocarbons which comprises heating pebbles in a heating zone to a temperature within the range of between 1200° F. and 3200° F.; gravitating said heated pebbles into a pebble soaking zone; gravitating said heated pebbles from said pebble soaking zone into and through a reaction zone; countercurrently contacting said heated pebbles with hydrocarbon reactant materials in direct heat exchange in said reaction zone; raising said hydrocarbon reactant materials to conversion temperature by said direct heat exchange; removing the resulting reaction products from within the upper portion of said reaction zone by passing said reaction products through a product withdrawal zone; passing an inert gas, while intermittently varying the flow thereof, into an annular heat exchange zone encompassing said product withdrawal zone and substantially coextensive therewith so as to maintain said latter zone at about the temperature of said reaction products; removing said inert gas from said annular heat exchange zone through said product withdrawal zone; removing said pebbles from the lower portion of said reaction zone; and returning said pebbles to said heating zone.

References Cited in the file of this patent
UNITED STATES PATENTS

| | | |
|---|---|---|
| 668,225 | Schniewind | Feb. 19, 1901 |
| 1,477,673 | Suber et al. | Dec. 18, 1923 |
| 2,320,147 | Layng et al. | May 25, 1943 |
| 2,488,488 | Bergstrom | Nov. 15, 1949 |
| 2,500,870 | Robinson | Mar. 14, 1950 |
| 2,534,625 | Robinson | Dec. 19, 1950 |
| 2,548,286 | Bergstrom | Apr. 10, 1951 |
| 2,623,842 | Robinson | Dec. 30, 1952 |
| 2,643,216 | Findlay | June 23, 1953 |
| 2,706,704 | Squires | Apr. 19, 1955 |
| 2,719,818 | Findlay | Oct. 4, 1955 |

FOREIGN PATENTS

| | | |
|---|---|---|
| 609,206 | Great Britain | Sept. 28, 1948 |